United States Patent
Ergen

(10) Patent No.: US 11,252,584 B2
(45) Date of Patent: Feb. 15, 2022

(54) METHOD AND SYSTEM FOR CONTROLLING A PLURALITY OF WI-FI ACCESS POINTS IN A WIRELESS NETWORK USING A CLOUD PLATFORM

(71) Applicant: Ambeent Wireless, Istanbul (TR)

(72) Inventor: Mustafa Ergen, Istanbul (TR)

(73) Assignee: AMBEENT WIRELESS, Istanbul (TR)

( * ) Notice: Subject to any disclaimer, the term of this patent is extended or adjusted under 35 U.S.C. 154(b) by 0 days.

(21) Appl. No.: 16/821,524

(22) Filed: Mar. 17, 2020

(65) Prior Publication Data

US 2021/0297875 A1 Sep. 23, 2021

(51) Int. Cl.
*H04W 24/02* (2009.01)
*H04W 84/12* (2009.01)
*H04W 76/10* (2018.01)
*H04L 41/0823* (2022.01)

(52) U.S. Cl.
CPC ......... *H04W 24/02* (2013.01); *H04L 41/0823* (2013.01); *H04W 76/10* (2018.02); *H04W 84/12* (2013.01)

(58) Field of Classification Search
CPC ........ G06N 20/00; G06N 3/088; G06F 30/18; G06F 30/27; H04W 84/12; H04W 36/32; H04W 24/04; H04W 4/029; H04W 72/04; H04W 88/08; H04W 88/18; H04W 12/06; H04W 12/08; H04W 12/61; H04W 12/63; H04W 16/14; H04W 24/02; H04W 28/0236; H04W 28/0268; H04W 28/0289; H04W 28/04; H04W 28/0925; H04W 28/10; H04W 28/16; H04W 72/0453; H04W 76/10; H04L 41/0823; H04L 41/16
See application file for complete search history.

(56) References Cited

U.S. PATENT DOCUMENTS

| | | | |
|---|---|---|---|
| 9,439,197 B1 * | 9/2016 | Ngo | H04W 16/14 |
| 2017/0264501 A1 * | 9/2017 | Mathen | H04L 41/16 |
| 2018/0102956 A1 * | 4/2018 | Amini | H04W 36/0055 |
| 2018/0160365 A1 * | 6/2018 | Zhang | H04W 48/16 |
| 2018/0183662 A1 * | 6/2018 | Likar | H04W 48/20 |
| 2019/0104430 A1 * | 4/2019 | Brisebois | H04B 17/364 |
| 2019/0116504 A1 * | 4/2019 | Rusackas | H04L 43/045 |
| 2021/0235459 A1 * | 7/2021 | Desai | H04W 52/143 |

* cited by examiner

*Primary Examiner* — Daniel Lai
(74) *Attorney, Agent, or Firm* — Chip Law Group

(57) ABSTRACT

The invention provides a method and system for controlling a plurality of Wi-Fi access points in a wireless network using a cloud platform. To start with, a connection is established between one or more Wi-Fi access points of the plurality of Wi-Fi access points and a client device using the cloud platform. Subsequently, details pertaining to the plurality of Wi-Fi access points are collected and analyzed using an Artificial Intelligence (AI) model. The AI model then derives configurations for the plurality of Wi-Fi access points in response to analyzing the details. Thereafter, the derived configurations are transmitted to the client device. The transmitted configurations are finally implemented at the plurality of access points using either the cloud platform or the client device. The derived configurations include optimization of Wi-Fi access point network parameters based on a frequency and a set of constraints.

13 Claims, 4 Drawing Sheets

METHOD AND SYSTEM FOR CONTROLLING A PLURALITY OF WI-FI ACCESS POINTS IN A WIRELESS NETWORK USING A CLOUD PLATFORM

FIELD OF THE INVENTION

The invention generally relates to automatically controlling a plurality of Wireless-Fidelity (Wi-Fi) access points in a Wi-Fi network. More specifically, the invention relates to remotely controlling configurations of a plurality of Wi-Fi access points from client devices using a cloud platform to optimize performance of the plurality of Wi-Fi access points.

BACKGROUND OF THE INVENTION

Wi-Fi networks are formed using one or more Wi-Fi access points (APs) that support a connection of multiple wireless devices to a wired connection for access to the Internet. Due to huge demand, enormous number of Wi-Fi APs are deployed in places such as, but not limited to, residential spaces, apartments, office buildings and public spaces and the Wi-Fi access points are densely concentrated around certain places with high data traffic.

Current Wi-Fi APs operate in an inefficient manner due to a decentralized decision-making structure and lack of adaptability in changing a network topology due to mobility of stations (STAs), increased number of Wi-Fi devices such as, but not limited to, mobile phones, Wi-Fi based Internet of Things (IoT) devices, smart televisions (TVs) and the like, and AP density. Also, current Wi-Fi network architectures accessed by users suffer from reduced throughput due to the decentralized structure.

Further, recent Wi-Fi protocol addresses the higher data delivery rate per time primarily by increased modulation that is applicable to only high signal to noise ratios (SNRs). On the other hand, due to increased number of Wi-Fi devices and IoT, the APs are always exposed to external neighbor signals.

Also, the current Wi-Fi APs include a channel scanning property, which scans the channels and performs a simplified channel assignment by considering received signal strength indicator (RSSI) that APs receive from nearby APs ($RSSI_{AP-AP}$) and the number of APs. If a new channel assignment is needed, the APs halt the transmission by taking the antenna into monitoring mode. The continuous repetition of halting the APs results in significant internet quality issues for STAs.

Further, a typical criterion in wireless communication is the signal quality which is the ratio of the primary signal power and the interfering signal powers on a same transmission channel. The signal quality of wireless communication is determined as signal to interference plus noise ratio (SINR), which is applicable to both STAs and APs. Since a STA becomes the transmitter when uploading data, the overall network quality is favored by increasing the SINRs for all individual network elements and for all transmission paths. Therefore, an RSSI matrix which includes $RSSI_{AP-AP}$, $RSSI_{AP-STA}$, $RSSI_{STA-AP}$, and $RSSI_{STA-STA}$ is considered for the most accurate decision making in selecting a transmission channel. Here, the $RSSI_{AP-AP}$ is the RSSI that APs receive from nearby APs, $RSSI_{AP-STA}$ is the RSSI that APs receive from nearby STAs, $RSSI_{STA-AP}$ is the RSSI that STAs receive from nearby APs, and $RSSI_{STA-STA}$ is the RSSI that STAs receive from nearby STAs. However, only a subset of RSSI matrix is measured in real time in a cost-effective manner and this in turn results in different approaches to Wi-Fi management.

Therefore, in light of the above, there is a need for a method and system for remotely managing/modifying configurations of Wi-Fi APs to enable the Wi-Fi APs to operate at optimal performance.

BRIEF DESCRIPTION OF THE FIGURES

The accompanying figures with reference numerals refer to identical or functionally similar elements throughout separate views and which together with the detailed description below are incorporated in and form part of the specification, serve to further illustrate various embodiments and to explain various principles and advantages all in accordance with the invention.

Figure 1:
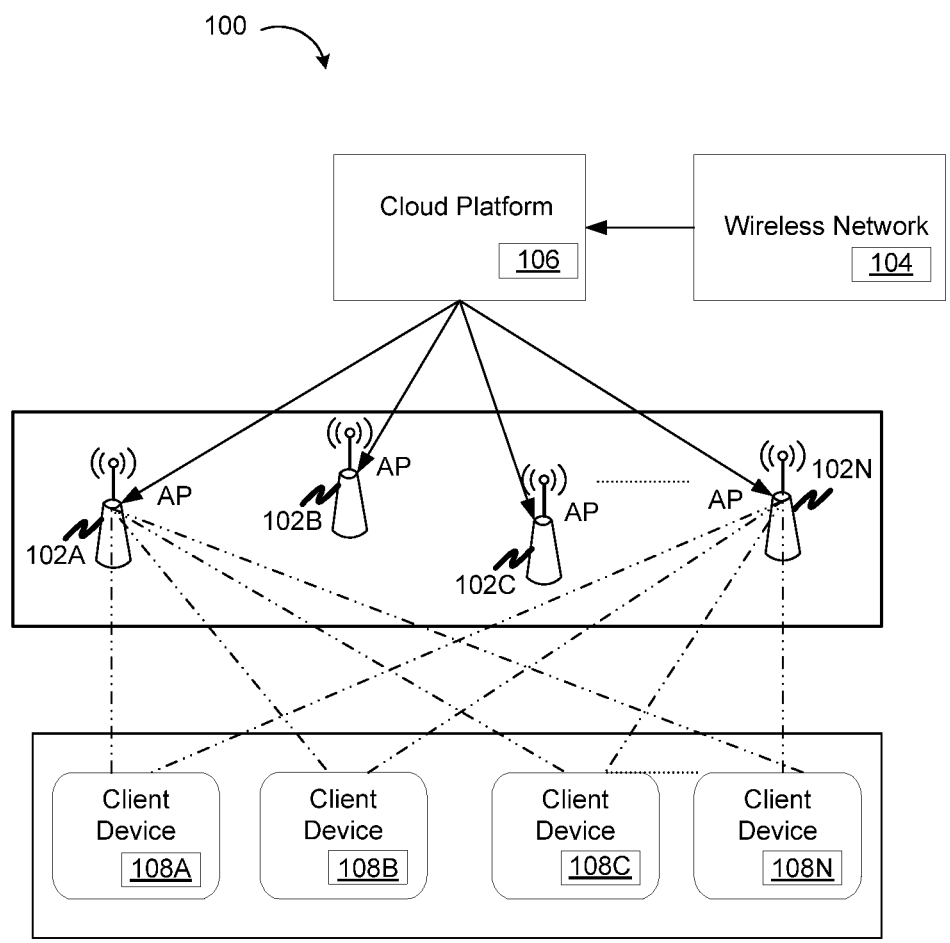
FIG. 1 illustrates a system for controlling a plurality of Wi-Fi access points in a wireless network using a cloud platform in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps and system components related to remotely controlling configurations of a plurality of Wi-Fi access points from client devices using a cloud platform to optimize performance of the plurality of Wi-Fi access points.

Accordingly, the system components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article or composition that comprises a list of elements does not include only those elements but may include other elements not expressly listed or inherent to such process, method, article or composition. An element proceeded by "comprises . . . a" does not, without more constraints, preclude the existence of additional identical elements in the process, method, article or composition that comprises the element.

Various embodiments of the invention provide a method and system for controlling a plurality of Wi-Fi access points in a wireless network using a cloud platform. The wireless network can be, but need not be limited to, a 5G autonomic mobile network. To start with, the method and system establishes a connection between one or more Wi-Fi access points of the plurality of Wi-Fi access points and a client device using the cloud platform. The cloud platform acts as an intermediary between the one or more Wi-Fi access points and the client device. Subsequently, the method and system collects details pertaining to the one or more Wi-Fi access points using the cloud platform, wherein the details comprise a set of credentials and network parameters associated with the plurality of Wi-Fi access points. The details which are collected are then analyzed using an Artificial Intelligence (AI) model. The AI model derives configurations for the one or more Wi-Fi access points in response to analyzing the details collected at the cloud platform. The derived configurations of the one or more Wi-Fi access points are then transmitted to the client device. Thereafter, the derived configurations are implemented in the one or more Wi-Fi access points using either the cloud platform or the client device. The derived configurations can include, but need not be limited to, optimization of one or more network parameters associated with the one or more Wi-Fi access points based on a frequency and a set of constraints.

FIG. 1 illustrates a system 100 for controlling a plurality of Wi-Fi access points 102A-102N in a wireless network 104 using a cloud platform 106 in accordance with an embodiment of the invention.

As illustrated in FIG. 1, cloud platform 106 is communicatively coupled to plurality of Wi-Fi access points 102A-102N, and a plurality of client devices 108A-108N via wireless network 104. Wireless network 104 can be, but need not be limited to, a 5G autonomic network.

In some embodiments, cloud platform 106 is communicatively coupled to plurality of nearby Wi-Fi access points 102A-102N, and plurality of client devices 108A-108N via an adaptive software-defined network (A-SDN).

An infrastructure management function of the A-SDN further comprises Spectrum Broker (SB) function which is configured to obtain, optimize and automate spectrum resources. The SB function can be extended to Low Power Wide Area Networks (LPWANs) that use sub-GHz radio frequencies (typically 433 or 868 MHz) with typical transmission ranges in the order of 1 up to 50 kilometers. Notorious initiatives in this domain include, but are not limited to, Long Range (LoRa), Sigfox and the upcoming IEEE 802.11ah (or "HaLow") standard or NarrowBand-Internet of Things (NB-IoT) and 5G massive machine-type communications (mMTC). The SB function considers signal strengths and application specific parameters to manage the spectrum.

Plurality of Wi-Fi access points 102A-102N are deployed in places such as, but not limited to, homes, enterprises and public spaces. Plurality of client devices 108A-108N are user devices such as, but not limited to, a mobile device, a personal digital assistant, a computer, a laptop, a smart phone and a tablet.

Further, cloud platform 106 is configured to establish a connection between one or more Wi-Fi access points of plurality of Wi-Fi access points 102A-102N and a client device 108A of plurality of client devices 108A-108N. Thus, cloud platform 106 acts as an intermediary between the one or more Wi-Fi access points and client device 108A. Cloud platform 106 is further described in detail in conjunction with FIG. 2.

In an embodiment, cloud platform 106 is configured to establish a connection between the one or more Wi-Fi access points and client device 108A as follows.

A connection is first established between the one or more Wi-Fi access points and cloud platform 106. Pursuant to establishing this connection, a connection is established between client device 108A and cloud platform 106. Thereafter, client device 108A is enabled to access the one or more Wi-Fi access points through cloud platform 106.

Figure 2:
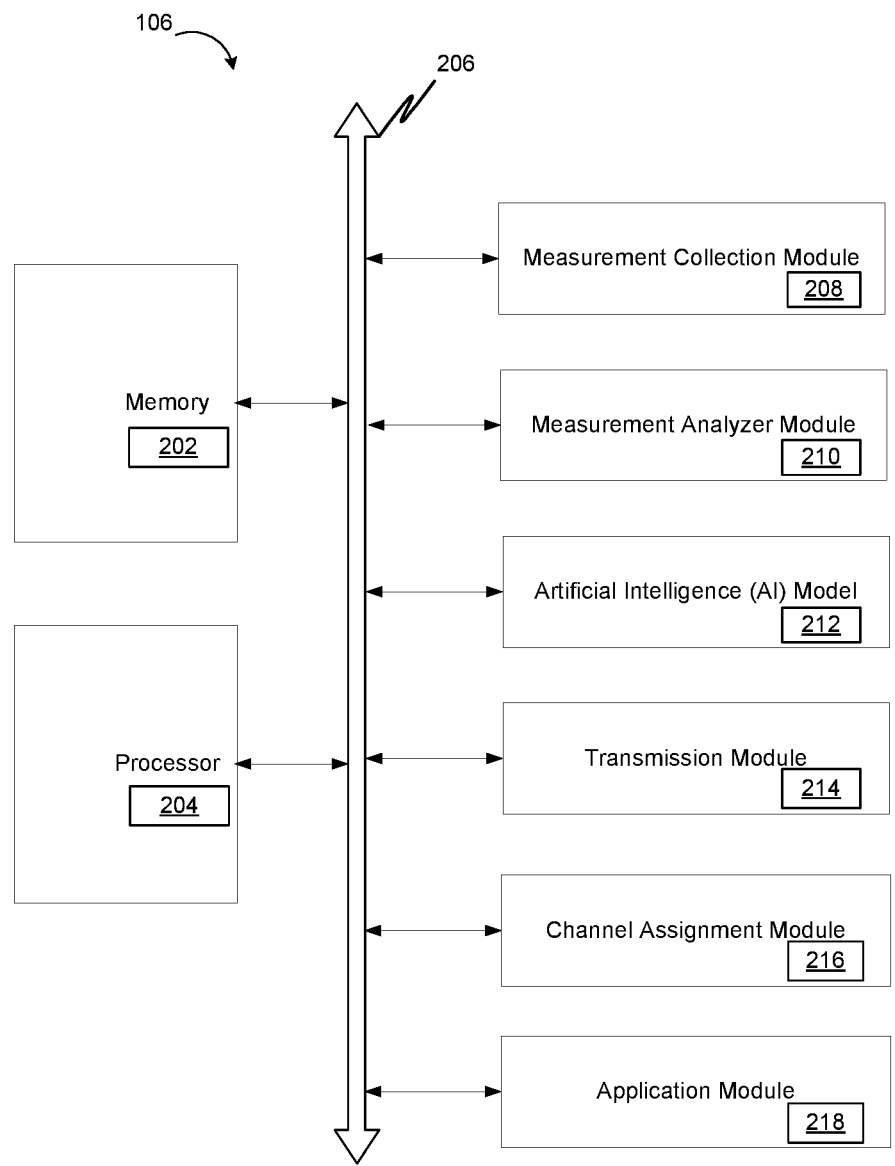
FIG. 2 illustrates various modules in the cloud platform for controlling a plurality of Wi-Fi access points in a wireless network in accordance with an embodiment of the invention.

FIG. 2 illustrates various modules in cloud platform 106 for controlling plurality of Wi-Fi access points 102A-102N in wireless network 104 in accordance with an embodiment of the invention.

As illustrated in FIG. 2, cloud platform 106 includes a memory 202, and a processor 204 communicatively coupled to memory 202. Memory 202 and processor 204 further communicate with various modules of cloud platform 106 via a communication module 206.

Communication module 206 may be configured to transmit data between modules, engines, databases, memories, and other components of cloud platform for use in performing the functions discussed herein. Communication module 206 may include one or more communication types and utilize various communication methods for communication within cloud platform 106.

Cloud platform 106 includes a measurement collection module 208 which collects details pertaining to one or more Wi-Fi access points of plurality of Wi-Fi access points 102A-102N, wherein the details comprise a set of credentials and network parameters associated with the one or more Wi-Fi access points.

The network parameters can be, but need not be limited to, an access point average access delay, an average access delay for each access category, an associated client device count, a channel utilization, a transmitted fragment count, a group addressed transmitted frame count, a failed count, a retry count, a multiple retry count, a frame duplicate count, a request to send (RTS) count, an RTS failure count, an acknowledge (ACK) failure count, a received fragment count, a group addresses received frame count, a frame check sequence (FCS) error count, a transmitted frame count, a received signal strength indicator (RSSI) on a client device and a total data transfer.

In an embodiment, measurement collection module 208 is an automated software function that mimics behaviour of users while changing access point properties. Measurement collection module 208 can browse the access point gateway web page when a client device is connected to an access point once the access point credentials are provided by a user.

The measurement details corresponding to the one or more Wi-Fi access points are then fed into a measurement analyzer module 210. The measurement information may include, but need not be limited to, RSSIs, radio frequency (RF) measurements, PING statistics, Universal Plug and Play (UPnP) information, and device information of plurality of Wi-Fi access points 102A-102N.

Measurement analyzer module 210 then analyzes the details pertaining to the one or more Wi-Fi access points, utilizing an Artificial Intelligence (AI) model 212.

AI model 212 derives configurations for the one or more Wi-Fi access points in response to analysing the measurement details. The derived configurations include, but need not be limited to, optimization of one or more network parameters associated with the one or more Wi-Fi access points based on a frequency and a set of constraints.

Once the configurations are derived by AI model 212, a Wi-Fi access point 102A of plurality of Wi-Fi access points 102A-102N or a Wi-Fi access point gateway or a Wi-Fi access point management server directly downloads the recent channel value and changes the optimal wireless channel internally. Further, AI model 212 is used to collect measurements from nearby Wi-Fi access points allocated in a cluster of a plurality of clusters to determine the location of a client device 108A of plurality of client devices 108A-108N.

A transmission module 214 then transmits the derived configurations for the one or more Wi-Fi access points to client device 108A. The derived configurations include, but need not be limited to, optimization of the one or more network parameters associated with the one or more Wi-Fi access points based on a frequency and a set of constraints.

The derived configurations are then implemented on the one or more Wi-Fi access points either via cloud platform 106 or via client device 108A.

The optimization of network parameters that are associated with the one or more Wi-Fi access points include, but need not be limited to, changing frequency bands and channels associated with the one or more Wi-Fi access points, updating frequency bands and channels associated with the one or more Wi-Fi access points, changing transmit power associated with the one or more Wi-Fi access points, changing Service Set Identifier (SSID) associated with the one or more Wi-Fi access points, changing security settings associated with the one or more Wi-Fi access points, and changing credentials and enabling parental control restrictions for the one or more Wi-Fi access points.

In an embodiment, Wi-Fi access point owners are enabled to adjust security settings of the one or more Wi-Fi access points using cloud platform 106.

Further, cloud platform 106 includes a channel assignment module 216 for changing/updating frequency bands and channels associated with the one or more Wi-Fi access points. Channel assignment module 216 also performs channel optimization by checking if the optimal channels in cloud platform 106 are different from current measurements based on a time limit, a Global Positioning System (GPS) change, and a Wi-Fi signal change. Channel assignment module 216 updates the channels of registered access points once a new measurement is available or based on a special request.

Cloud platform 106 further includes an application module 218 to change the channel and the implementation function can operate in two ways as either application focused and cloud focused.

Application module 218 in conjunction with measurement collection module 208 can read access point parameters such as, but not limited to, Wi-Fi password, and SSID, available on plurality of Wi-Fi access points 102A-102N. Application module 218 can change any of the access point parameters such as, but not limited to, transmission channel, transmit power, and parental control restrictions. Further, application module 218 can obtain details regarding a brand of a Wi-Fi access point by utilizing MAC address from the first 6 digits. The user is allowed to select a brand from plurality of brands that have different gateway web page. Application module 218 can further understand whether the brand name is true during browsing.

In the application focused method, application module 218 checks the optimum channels in the background based on several parameters such as, but not limited to, time limit, GPS change, and Wi-Fi signal change, wherein the time limit refers to a sample time that is determined for the channel check and GPS change refers to a check that is applied if GPS data changes significantly. Once Wi-Fi signals change significantly, a new channel optimization is calculated by the cloud based on the recent measurements. Application module 218 then checks whether there is a change, and informs cloud platform 106 regarding the channel update.

On the other hand, in the cloud focused method, application module 218 does not have to be connected to the Wi-Fi network. In this implementation, application module 218 receives the encrypted credentials of routers, their MAC addresses and optimum channels. Once the client devices connect to any registered Wi-Fi access point, application module 218 decrypts the access point credentials and changes the channel, and informs the cloud regarding the channel update.

Cloud platform 106 can also deliver the Wi-Fi passwords associated with the Wi-Fi access points to nearby client devices to switch/change the channels. Once application module 218 reports a nearby registered access point, cloud platform 106 delivers the encrypted Wi-Fi password to application module 218 for a reserved period.

At each browsing action, application module 218 checks whether buttons and other web page elements are around. When a difference in the buttons and other web page elements is identified, application module 218 reports that the Wi-Fi access point brand is not accurate. application module 218 determines the brand of some Wi-Fi access points based on the gateway HTML codes. A part of the brand information is implemented on the HTML code and application module 218 can obtain the model directly through next processing.

For delivering the encrypted Wi-Fi password of the Wi-Fi access points, application module 218 is required to report to nearby Wi-Fi access point MACs. Cloud platform 106 determines if any of the nearby Wi-Fi access points are previously registered. If any of the Wi-Fi access points are registered, application module 218 obtains the optimal channel of the corresponding Wi-Fi access point from a database, as calculated by cloud platform 106. Application module 218 then obtains the encrypted Wi-Fi password from cloud platform 106 and decrypts the Wi-Fi password.

Subsequently, application module 218 connects client device 108A to the network and client device 108A is configured to connect to the gateway. Client device 108A then obtains the access point credentials and changes the channels in the access point gateway. Thereafter, application module 218 deletes all the information related to a Wi-Fi access point from plurality of Wi-Fi access points 102A-102N which in turn enables the Wi-Fi access point to start transmission via the optimal channel.

Figure 3:
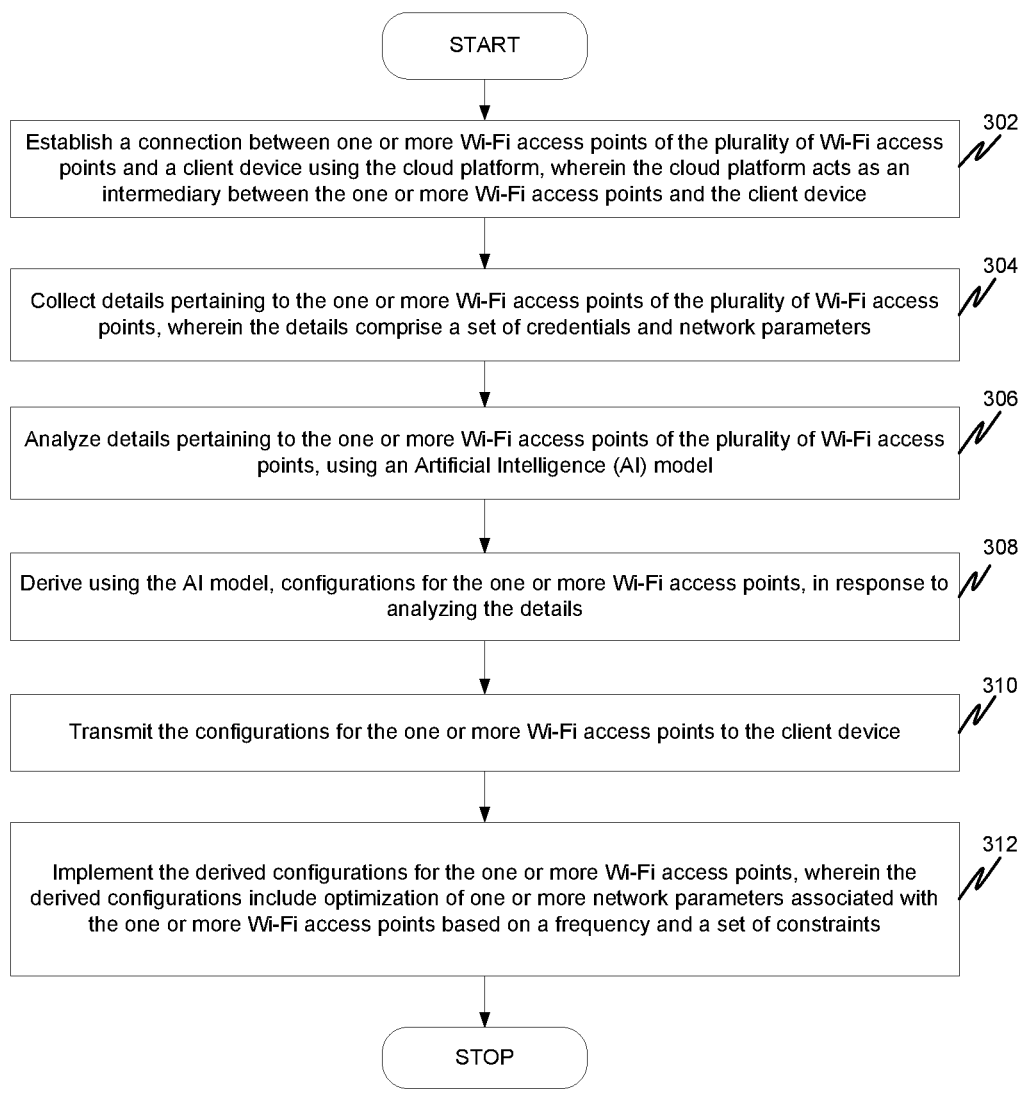
FIG. 3 illustrates a flowchart of a method for controlling a plurality of Wi-Fi access points in a wireless network using a cloud platform in accordance with an embodiment of the invention.

FIG. 3 illustrates a flowchart of a method for controlling plurality of Wi-Fi access points 102A-102N in wireless network 104 using cloud platform 106 in accordance with an embodiment of the invention.

In some embodiments, cloud platform 106 is communicatively coupled to plurality of nearby Wi-Fi access points 102A-102N, and plurality of client devices 108A-108N via an adaptive software-defined network (A-SDN).

An infrastructure management function of the A-SDN further comprises Spectrum Broker (SB) function which is configured to obtain, optimize and automate spectrum resources. The SB function can be extended to Low Power Wide Area Networks (LPWANs) that use sub-GHz radio frequencies (typically 433 or 868 MHz) with typical transmission ranges in the order of 1 up to 50 kilometers. Notorious initiatives in this domain include, but are not limited to, Long Range (LoRa), Sigfox and the upcoming IEEE 802.11ah (or "HaLow") standard or NarrowBand-Internet of Things (NB-IoT) and 5G massive machine-type communications (mMTC). The SB function considers signal strengths and application specific parameters to manage the spectrum.

To start with, at step 302, a connection between one or more Wi-Fi access points of plurality of Wi-Fi access points 102A-102N and client device 108A is established using cloud platform 106. Cloud platform 106 acts as an intermediary between the one or more Wi-Fi access points and client device 108A. Step 302 is further explained in detail in conjunction with FIG. 4.

Upon establishing the connection with the one or more Wi-Fi access points, at step 304, measurement collection module 208 in cloud platform 106 collects measurement details pertaining to the one or more Wi-Fi access points. The details include, but need not be limited to, a set of credentials and network parameters associated with the one or more Wi-Fi access points.

In an ensuing step 306, measurement analyzer module 210 analyzes the details pertaining to the one or more Wi-Fi access points using AI model 212.

At step 308, AI model 212 derives configurations for the one or more Wi-Fi access points at cloud platform 106, in response to analyzing the information from measurement analyzer module 210.

At step 310, the derived configurations pertaining to the one or more Wi-Fi access points are transmitted to the client device.

At step 312, the derived configurations are implemented for the one or more Wi-Fi access points using either cloud platform 106 or client device 108A. The derived configurations include optimization of one or more network parameter associated with one or more Wi-Fi access points based on a frequency and a set of credentials.

Optimization of network parameters that are associated with the one or more Wi-Fi access points include, but need not be limited to, changing frequency bands and channels associated with the one or more Wi-Fi access points, updating frequency bands and channels associated with the one or more Wi-Fi access points, changing transmit power associated with the one or more Wi-Fi access points, changing Service Set Identifier (SSID) associated with the one or more Wi-Fi access points, changing security settings associated with the one or more Wi-Fi access points, and changing credentials and enabling parental control restrictions for the one or more Wi-Fi access points.

In an embodiment, Wi-Fi access point owners are enabled to adjust security settings of the one or more Wi-Fi access points using cloud platform 106.

Further, channel optimization is performed by checking if the optimal channels in cloud platform 106 are different from current measurements based on a time limit, a GPS change, and a Wi-Fi signal change.

Figure 4:
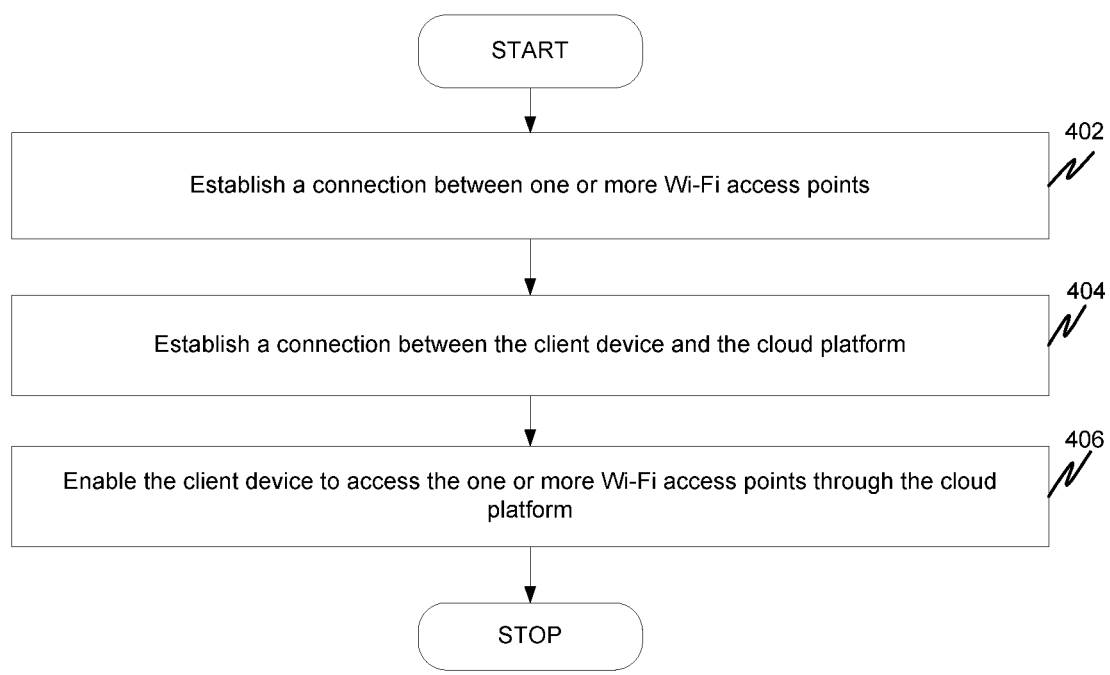
FIG. 4 illustrates a flowchart of a method for establishing a connection between one or more Wi-Fi access points of a plurality of Wi-Fi access points and a client device using a cloud platform in accordance with an embodiment of the invention.

FIG. 4 illustrates a flowchart of a method for establishing a connection between one or more Wi-Fi access points and client device 108A using cloud platform 106 in accordance with an embodiment of the invention.

At step 402, a connection is established between the one or more Wi-Fi access points and cloud platform 106.

In an ensuing step 404, a connection is established between client device 108A and cloud platform 106.

Thereafter, at step 406, client device 108A is enabled to access the one or more Wi-Fi access points through cloud platform 106.

In an embodiment, client device 108A is connected to a Wi-Fi access point 102A of plurality of Wi-Fi access points 102A-102N using application module 218 installed on client device 108A.

Various embodiments of the invention provide a method and system for implementing software defined network (SDN) decisions for configuring one or more Wi-Fi access points using an application such as, but not limited to, a mobile application. The method and system also implements SDN decisions for configuring Wi-Fi access points when there is no connected client device. For instance, if no user is connected to a Wi-Fi access point at certain times during a day, the cloud platform can also directly implement the decisions if the remote access is possible.

Advantageously, the method and system includes messaging to provide connection of home, enterprise and carrier Wi-Fi access points to the cloud platform. Messaging provides connection of a Wi-Fi client to the cloud platform, along with retrieval and manipulation of the Wi-Fi access point and client data. Further, the cloud platform implements real-time optimization approaches on the network.

Furthermore, the invention provides an effective mechanism that will mediate and optimize the contention that the 6 GHz bandwidth causes between 5G and Wi-Fi for channel access.

Further, the proposed approach integrates several additional network layers and applications for integration of one or more client devices and Wi-Fi access points. The network statistics are monitored for enabling the implementation of self-organized focused decisions and cost-effective implementation of the real-time decisions on the network. Furthermore, the proposed invention enables decentralized Wi-Fi networks to be adjusted through a single network to have them operate at optimal performance.

Those skilled in the art will realize that the above recognized advantages and other advantages described herein are merely exemplary and are not meant to be a complete rendering of all of the advantages of the various embodiments of the invention.

The system, as described in the invention or any of its components may be embodied in the form of a computing device. The computing device can be, for example, but not limited to, a general-purpose computer, a programmed microprocessor, a micro-controller, a peripheral integrated circuit element, and other devices or arrangements of devices, which are capable of implementing the steps that constitute the method of the invention. The computing device includes a processor, a memory, a nonvolatile data storage, a display, and a user interface.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for controlling a plurality of Wireless Fidelity (Wi-Fi) access points in a wireless network by a cloud platform, the method comprising:
   establishing, by one or more processors of the cloud platform, a connection between at least one Wi-Fi access point of the plurality of Wi-Fi access points and a client device,
   wherein the cloud platform acts as an intermediary between the at least one Wi-Fi access point and the client device;
   collecting, by the one or more processors, details pertaining to at least one Wi-Fi access point of the plurality of Wi-Fi access points,
   wherein the details comprise a set of credentials and network parameters;
   analyzing, by the one or more processors, details pertaining to the at least one Wi-Fi access point of the plurality of Wi-Fi access points, utilizing an Artificial Intelligence (AI) model;
   deriving, by the one or more processors, configurations for the at least one Wi-Fi access point based on, analyzing the details and the AI model;
   downloading a channel value of a channel associated with the at least one Wi-Fi access point based on the derivation of the configurations for the at least one Wi-Fi access point by the AI model;
   transmitting, by the one or more processors, the derived configurations for the at least one Wi-Fi access point to the client device, based on the channel value of the channel associated with the at least one Wi-Fi access point and the AI model; and
   implementing, by the one or more processors, the derived configurations for the at least one Wi-Fi access point, based on one of the cloud platform or the client device,
   wherein the deriving of the configurations includes optimizing at least one network parameter associated with the at least one Wi-Fi access point, and
   wherein the at least one network parameter associated with the at least one Wi-Fi access point is optimized based on a frequency and a set of constraints.

2. The method of claim 1, wherein the wireless network is a 5G autonomic network.

3. The method of claim 1, wherein establishing the connection comprises:
   establishing, by the one or more processors, a connection between the at least one Wi-Fi access point and the cloud platform;
   establishing, by the one or more processors, a connection between the client device and the cloud platform; and
   enabling, by the one or more processors, the client device to access the at least one Wi-Fi access point through the cloud platform.

4. The method of claim 3, wherein the client device is connected to a Wi-Fi access point of the plurality of Wi-Fi access points by an application installed on the client device.

5. The method of claim 1, wherein optimizing the at least one network parameter comprises at least one of changing frequency bands and channels associated with the at least one Wi-Fi access point, updating frequency bands and channels associated with the at least one Wi-Fi access point, changing transmit power associated with the at least one Wi-Fi access point, changing Service Set Identifier (SSID) associated with the at least one Wi-Fi access point, changing security settings associated with the at least one Wi-Fi access point, and changing credentials and enabling parental control restrictions for the at least one Wi-Fi access point.

6. The method of claim 5, wherein implementing the derived configurations further comprises enabling, by the one or more processors, Wi-Fi access point owners to adjust security settings of the at least one Wi-Fi access point.

7. The method of claim 5 further comprises performing, by the one or more processors, channel optimization by checking if the optimal channels in the cloud platform are different from current measurements based on a time limit, a Global Positioning System (GPS) change, and a Wi-Fi signal change.

8. A system for controlling a plurality of Wireless Fidelity (Wi-Fi) access points in a wireless network by a cloud platform, the system comprising:
   a memory;
   a processor communicatively coupled to the memory, wherein the processor is configured to:
      establish a connection between at least one Wi-Fi access point of the plurality of Wi-Fi access points and a client device,
      wherein the cloud platform acts as an intermediary between the at least one Wi-Fi access point and the client device;
      collect details pertaining to at least one Wi-Fi access point of the plurality of Wi-Fi access points,
      wherein the details comprise a set of credentials and network parameters;
      analyze details pertaining to the at least one Wi-Fi access point of the plurality of Wi-Fi access points, utilizing an Artificial Intelligence (AI) model;
      derive configurations for the at least one Wi-Fi access point based on analyzing the details and the AI model;
      downloading a channel value of a channel associated with the at least one Wi-Fi access point based on the derivation of the configurations for the at least one Wi-Fi access point by the AI model;
      transmit the derived configurations for the at least one Wi-Fi access point to the client device, based on the channel value of the channel associated with the at least one Wi-Fi access point and the AI model; and
      implement the derived configurations for the at least one Wi-Fi access point,
      wherein the deriving of the configurations includes optimizing at least one network parameter associated with the at least one Wi-Fi access point, and
      wherein the at least one network parameter associated with the at least one Wi-Fi access point is optimized based on a frequency and a set of constraints.

9. The system of claim 8, wherein the processor is further configured to:
   establish a connection between the at least one Wi-Fi access point and the cloud platform;
   establish a connection between the client device and the cloud platform; and
   enable the client device to access the at least one Wi-Fi access point through the cloud platform.

10. The system of claim 9, wherein the client device is connected to a Wi-Fi access point of the plurality of Wi-Fi access points by an application installed on the client device.

11. The system of claim 8, wherein the processor is further configured to perform at least one of change frequency bands and channels associated with the at least one Wi-Fi access point, update frequency bands and channels associated with the at least one Wi-Fi access point, change transmit power associated with the at least one Wi-Fi access point, change Service Set Identifier (SSID) associated with the at least one Wi-Fi access point, change security settings associated with the at least one Wi-Fi access point, and change credentials and enable parental control restrictions for the at least one Wi-Fi access point.

12. The system of claim 11, wherein the processor is further configured to enable Wi-Fi access point owners to adjust security settings of the at least one Wi-Fi access point.

13. The system of claim 11, wherein the processor is further configured to perform channel optimization by checking if the optimal channels in the cloud platform are different from current measurements based on a time limit, a Global Positioning System (GPS) change, and a Wi-Fi signal change.

* * * * *